(12) United States Patent
Grossman et al.

(10) Patent No.: US 8,061,181 B2
(45) Date of Patent: *Nov. 22, 2011

(54) INERTIAL SENSOR MISALIGNMENT AND COMPENSATION

(75) Inventors: Owen Grossman, Golden Valley, MN (US); Lawrence C. Vallot, Lake Elmo, MN (US)

(73) Assignee: Honeywell International Inc., Morristown, NJ (US)

( * ) Notice: Subject to any disclaimer, the term of this patent is extended or adjusted under 35 U.S.C. 154(b) by 821 days.

This patent is subject to a terminal disclaimer.

(21) Appl. No.: 12/122,504

(22) Filed: May 16, 2008

(65) Prior Publication Data

US 2009/0282893 A1    Nov. 19, 2009

(51) Int. Cl.
*G01C 17/38* (2006.01)
(52) U.S. Cl. .................................................. 73/1.75
(58) Field of Classification Search .................. None
See application file for complete search history.

(56) References Cited

U.S. PATENT DOCUMENTS

| | | | |
|---|---|---|---|
| 4,816,759 A | 3/1989 | Ames et al. | |
| 4,879,918 A | 11/1989 | Hojo | |
| 5,247,748 A * | 9/1993 | Hojo et al. | 33/326 |
| 5,559,598 A | 9/1996 | Matsumoto | |
| 5,617,023 A | 4/1997 | Skalski | |
| 5,896,200 A | 4/1999 | Shu | |
| 6,196,514 B1 | 3/2001 | Kienholz | |
| 6,763,318 B1 | 7/2004 | Winter et al. | |
| 6,826,478 B2 | 11/2004 | Riewe et al. | |
| 7,337,650 B1 | 3/2008 | Preston et al. | |
| 7,370,428 B2 * | 5/2008 | Decker, Jr. | 33/366.11 |
| 2003/0098972 A1 | 5/2003 | McMillan et al. | |
| 2005/0283330 A1 | 12/2005 | Laraia et al. | |
| 2006/0058946 A1 | 3/2006 | Chappell | |

FOREIGN PATENT DOCUMENTS

JP    2001153658    * 11/1999

OTHER PUBLICATIONS

European Patent Office, "European Search Report", Nov. 5, 2009, Published in: EP.

* cited by examiner

*Primary Examiner* — Robert Raevis
(74) *Attorney, Agent, or Firm* — Fogg & Powers LLC

(57) ABSTRACT

An apparatus for providing information pertaining to the orientation of a vehicle to which the apparatus is coupled includes a chassis having a first interior surface and an inertial-sensor assembly disposed within the chassis and having a first exterior surface. A first sensor element is mounted on the first interior surface, and a second sensor element is mounted on the first exterior surface. At least one of the first and second sensor elements is configured to generate a first signal corresponding to an angle of displacement of the second sensor element with respect to the first sensor element.

19 Claims, 3 Drawing Sheets

INERTIAL SENSOR MISALIGNMENT AND COMPENSATION

BACKGROUND OF THE INVENTION

Certain inertial reference systems, such as those associated with aircraft navigation, for example, require the inertial sensors (e.g., gyroscopes, accelerometers, etc.) to be mechanically isolated from the rest of the system in order to attain the required inertial sensor accuracy and reliability. Referring to FIG. 1, for example, an inertial-sensor assembly (ISA) 10 may be mounted within an enclosure or chassis 20 and vibration isolated from the chassis through the use of, for example, elastomeric isolators 30 operable to reduce sensor vibration exposure.

However, such an isolation scheme allows the ISA 10 to rotate through an angle 40 relative to the chassis 20 and, as such, the vehicle for which accurate spatial-orientation information is required. This may be due to a number of factors such as temperature, linear and angular acceleration, age, etc. Although, for purposes of clarity, rotation of the ISA 10 in a one-dimensional plane is shown in the drawing figures, the ISA is free to rotate slightly in all three dimensions. In conventional strapdown inertial navigation system arrangements, this rotational motion of the ISA 10 is generally unmeasured or otherwise unaccounted for in the inertial navigation solution calculated by a processing device 50 in signal communication with the ISA. Further, this motion degrades the knowledge of the chassis 20 orientation, even if the ISA 10 orientation is perfectly known.

As such, a mechanical isolation may itself be a source of misalignment error. Moreover, a typical navigation system does not, with great accuracy, take into account mechanical misalignment between the system chassis and the mechanically isolated ISA.

SUMMARY OF THE INVENTION

In an embodiment, an apparatus for providing information pertaining to the orientation of a vehicle to which the apparatus is coupled includes a chassis having a first interior surface and an inertial-sensor assembly disposed within the chassis and having a first exterior surface. A first sensor element is mounted on the first interior surface, and a second sensor element is mounted on the first exterior surface. At least one of the first and second sensor elements is configured to generate a first signal corresponding to an angle of displacement of the second sensor element with respect to the first sensor element.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

An embodiment of the invention enables a method of non-contact measure of the angular relationship between a navigation system chassis and an ISA. These measures of angle can then be incorporated into the inertial-reference computation to correct for mechanical misalignment within the system.

Figure 1:
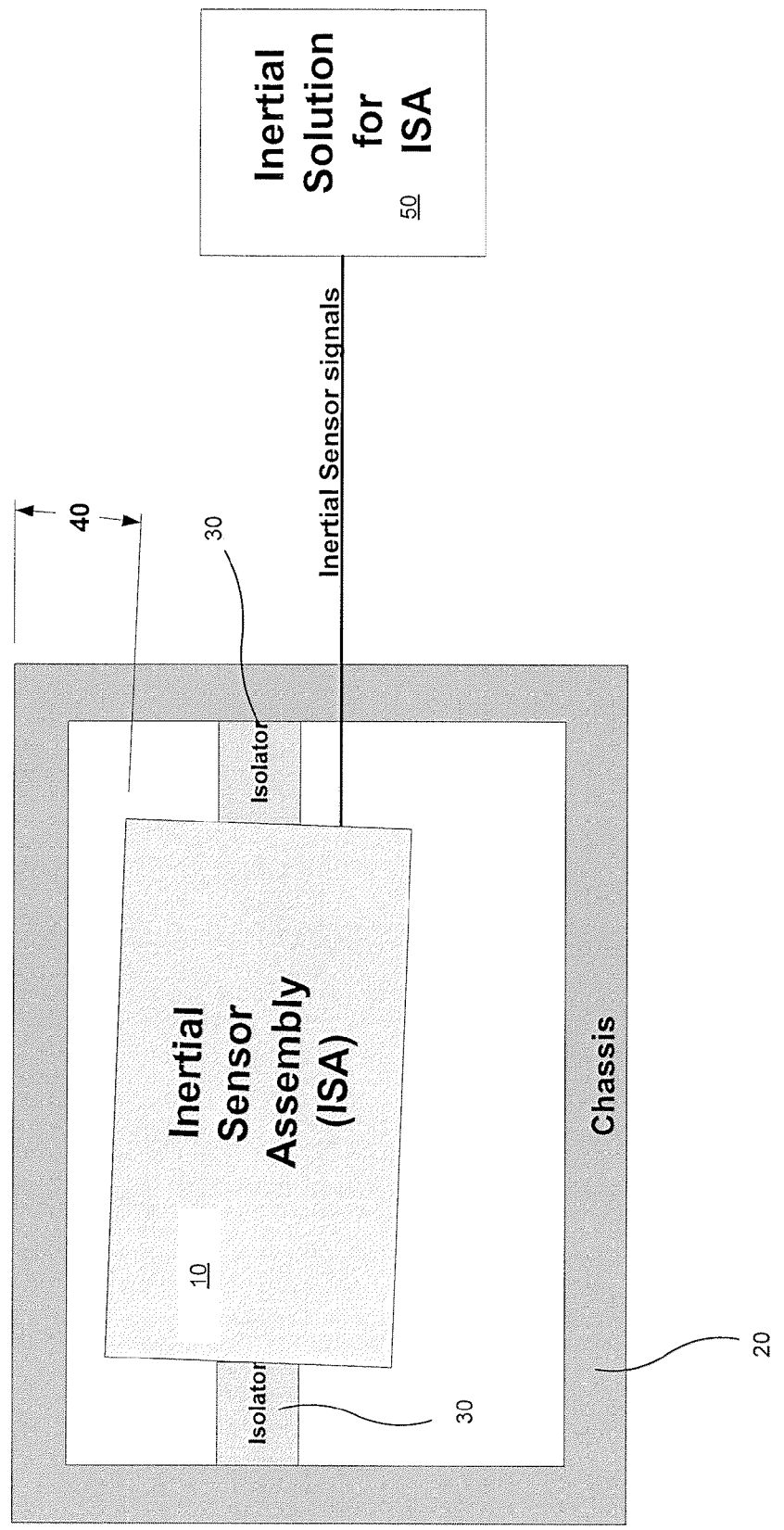
FIG. 1 is a schematic view of a prior-art apparatus.
Figure 2:
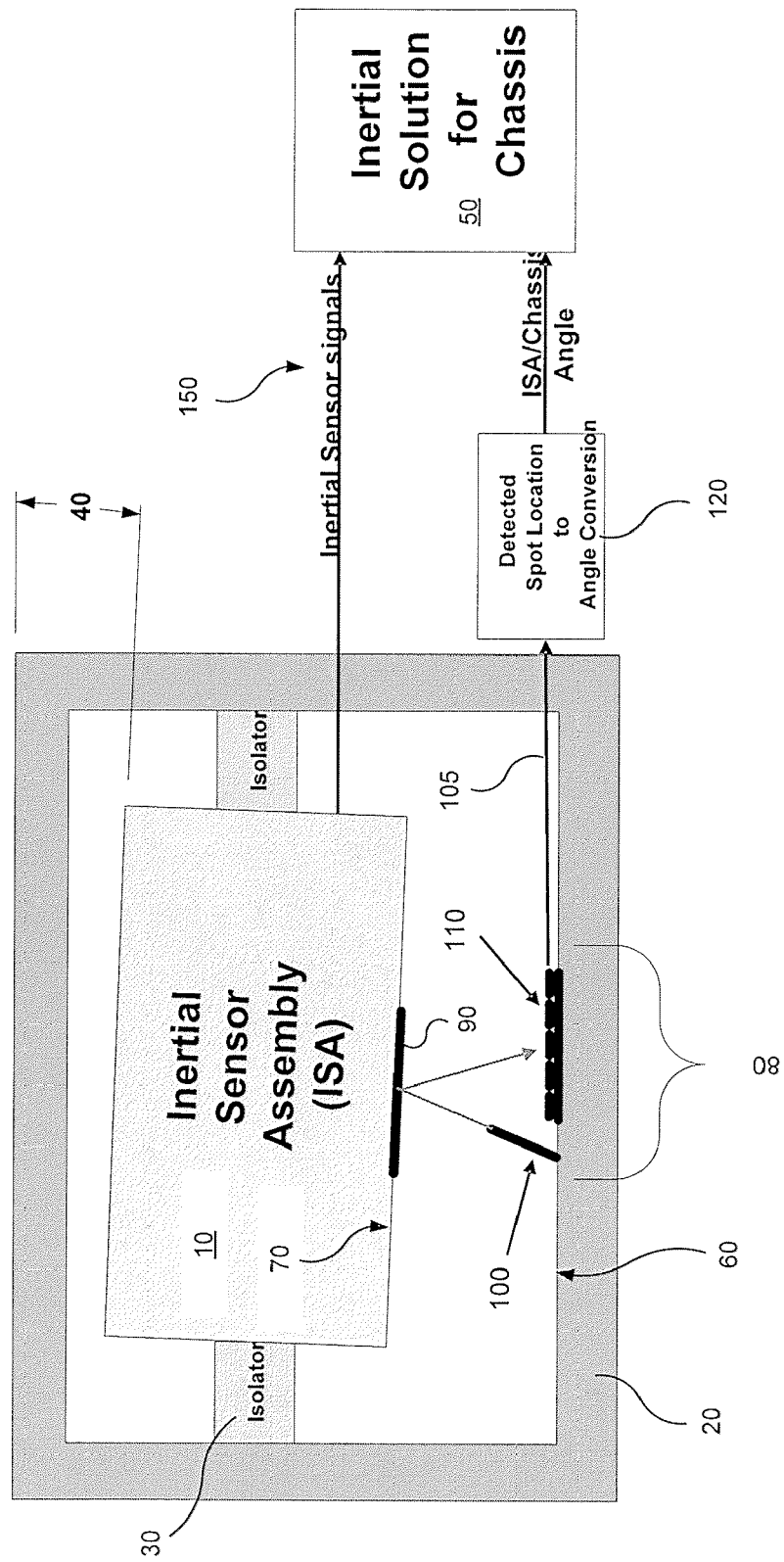
FIG. 2 is a schematic view of an apparatus according to an embodiment of the present invention.

Referring now to FIG. 2, illustrated is an apparatus according to a first embodiment of the present invention. Like reference numerals are used for elements like those illustrated in FIG. 1. As such, shown is a chassis 20 having a first interior surface 60 and an ISA 10 disposed within the chassis and having a first exterior surface 70. A first sensor element 80 is mounted on the first interior surface 60, and a second sensor element 90 is mounted on the first exterior surface 70. In the embodiment illustrated in FIG. 2, the first sensor 80 includes a light source 100, such as a laser, and a photo-detector array 110. The second sensor 90 includes a reflective device, such as a mirror, operable to reflect emissions of the light source 100 on to the array 110. The array 110 is configured to generate at least one signal corresponding to an angle of displacement of the second sensor element 90 with respect to the first sensor element 80. These signals can be transmitted from the array 110 to a signal-conversion element 120, which may include a processor or other computational device, via a conductive element, such as a cable 105. Alternatively, such signals could be communicated to the conversion element 120 via known wireless techniques. The conversion element 120 may function to determine, based on the portion of the photoarray 110 on which light reflected by the second sensor element falls, the angle of the ISA 10 with respect to the chassis 20. The conversion element 120 may employ a look-up table, for example. Alternatively, all functionality of the conversion element 120 may be implemented in a processing device 50 discussed in further detail below. In the preferred embodiment, the placements of the light source 100, reflective device, and photodetector array 110 are selected so as to provide nominal light paths as close as possible to being perpendicular to the reflecting surface. This design feature may be implemented to minimize the impact of ISA translational motion on the position of the light-spot arrival at the detector array.

An embodiment may employ two or more of such source/mirror/photoarray combinations ("sensor combination"), each such sensor combination being similar in configuration and functionality to the first and second sensor elements 80, 90 illustrated in FIG. 2. In such an embodiment, each such sensor combination can be oriented in two or three different mutually orthogonal axes. In other words, each sensor combination (not shown) additional to the first and second sensor elements 80, 90 illustrated in FIG. 2 could include source/mirror/photoarray elements mounted on interior surfaces of the chassis 20 and exterior surfaces of the ISA 10 at respective 90-degree angles with respect to surfaces 60 and 70. Each sensor combination may be calibrated such that a reflected emission of the light source will fall on a portion of the photoarray corresponding to the chassis 20 being at rest. Angular displacement of the ISA 10 with respect to the chassis 20 will cause the reflected emission to fall on other portions of the photoarray directly corresponding to a particular magnitude of angular displacement. Measurement of up to three such angles indicated by up to three such sensor combinations would enable the processing device 50 to calculate the three-dimensional spatial orientation of the ISA 10 with respect to the chassis 20. In turn, this spatial-orientation determination can then, along with inertial-sensor signals 150 received from the ISA 10, be incorporated into the inertial-reference computation to account for misalignment of the ISA with respect to the chassis 20. In an embodiment, the raw data from the array 110 could also be an added parameter in the solution. In such case, the raw data would be treated the same as other signals, such as temperature, used for compensation in the computation.

Figure 3:
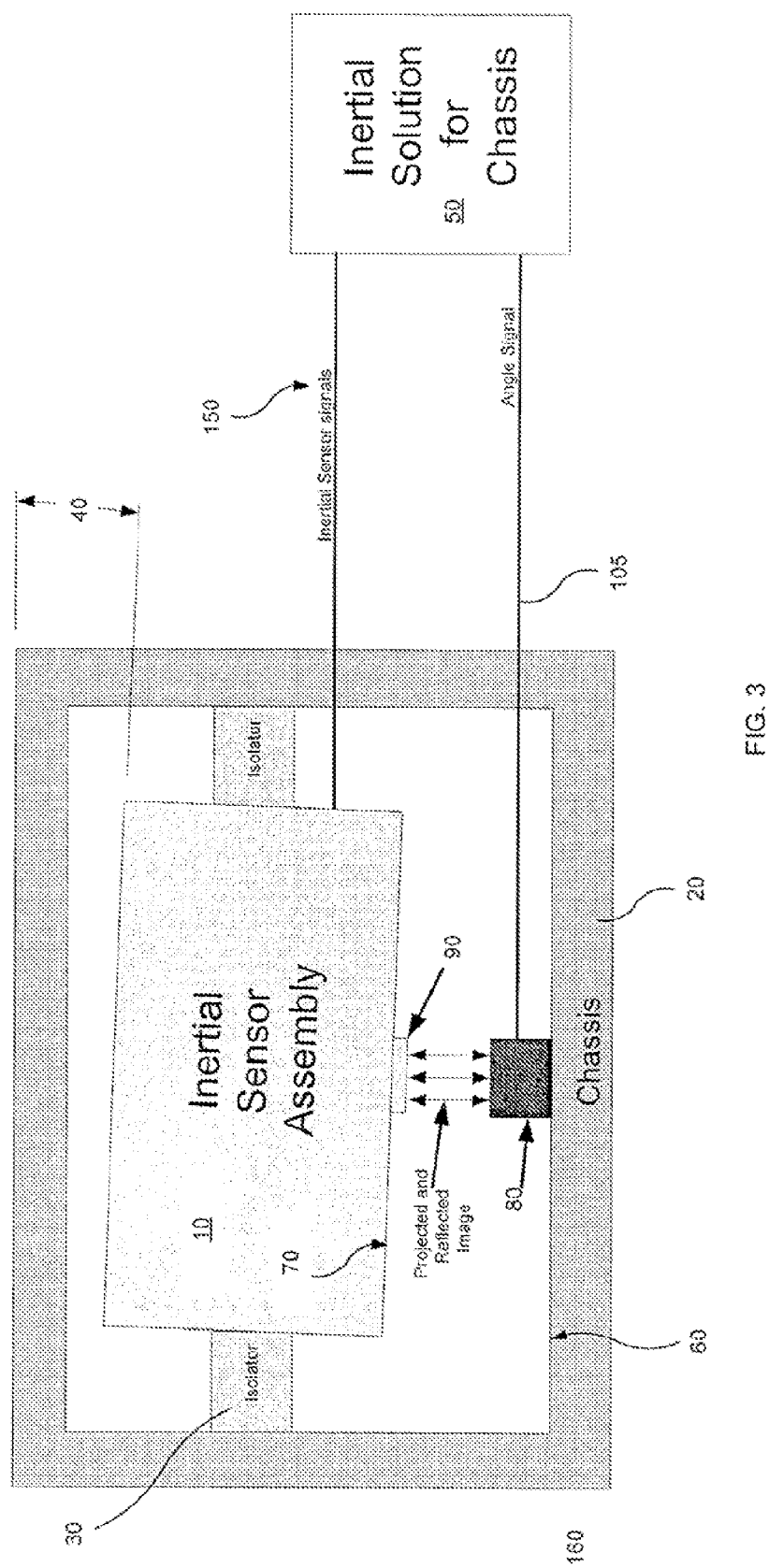
FIG. 3 is a schematic view of an apparatus according to an alternative embodiment of the present invention.

Referring now to FIG. 3, illustrated is an apparatus according to a second embodiment of the present invention. Like reference numerals are used for elements like those illustrated in FIGS. 1 and 2. As such, shown is a chassis 20 having a first interior surface 60 and an ISA 10 disposed within the chassis and having a first exterior surface 70. A first sensor element 80 is mounted on the first interior surface 60, and a second sensor element 90 is mounted on the first exterior surface 70. In the embodiment illustrated in FIG. 3, the first sensor 80 includes an autocollimator. The second sensor 90 includes a reflective device, such as a mirror, operable to reflect images emitted by the first sensor 80. The first sensor 80 is configured to generate at least one signal corresponding to an angle of displacement of the second sensor element 90 with respect to the first sensor element 80. These signals can be transmitted from the first sensor 80 to a processing device 50 via a conductive element, such as a cable 105. Alternatively, such signals could be communicated to the processing device 50 via known wireless techniques. The first sensor 80 may function to determine, based on its reflected emissions, the angle of the ISA 10 with respect to the chassis 20.

An embodiment may employ two or more of such autocollimator/mirror combinations ("sensor combination"), each such sensor combination being similar in configuration and functionality to the first and second sensor elements 80, 90 illustrated in FIG. 3. In such an embodiment, each such sensor combination can be oriented in two or three different mutually orthogonal axes. In other words, each sensor combination (not shown) additional to the first and second sensor elements 80, 90 illustrated in FIG. 3 could include autocollimator/mirror elements mounted on interior surfaces of the chassis 20 and exterior surfaces of the ISA 10 at respective 90-degree angles with respect to surfaces 60 and 70. Each sensor combination may be calibrated such that a reflected image generated by the autocollimator will have an alignment corresponding to the chassis 20 being at rest. Angular displacement of the ISA 10 with respect to the chassis 20 will cause the reflected image to have alignments directly corresponding to a particular magnitude of angular displacement. Measurement of up to three such angles indicated by up to three such sensor combinations would enable the processing device 50 to calculate the three-dimensional spatial orientation of the ISA 10 with respect to the chassis 20. In turn, this spatial-orientation determination can then, along with inertial-sensor signals 150 received from the ISA 10, be incorporated into the inertial-reference computation to account for misalignment of the ISA with respect to the chasis 20.

While a preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An apparatus for providing information pertaining to the orientation of an object to which the apparatus is coupled, the apparatus comprising:
   a chassis having a first interior surface and a second interior surface;
   an inertial-sensor assembly disposed within the chassis and having a first exterior surface and a second exterior surface;
   a first sensor element mounted on the first interior surface;
   a second sensor element mounted on the first exterior surface, at least one of the first and second sensor elements configured to generate a first signal corresponding to an angle of displacement of the second sensor element with respect to the first sensor element;
   a third sensor element mounted on the second interior surface;
   a fourth sensor element mounted on the second exterior surface, at least one of the third and fourth sensor elements configured to generate a second signal corresponding to an angle of displacement of the fourth sensor element with respect to the third sensor element; and
   a processing device coupled to at least one of the first and second sensor elements and configured to determine an orientation solution for the object based on information provided by the inertial-sensor assembly and the angle of displacement of the second sensor element with respect to the first sensor element.

2. The apparatus of claim 1, wherein the first signal is transmitted to the processing device via a cable.

3. The apparatus of claim 1, wherein the processing device is coupled to at least one of the third and fourth sensor elements; and
   wherein the processing device is further configured to determine the orientation solution for the object based on the angle of displacement of the fourth sensor element with respect to the third sensor element.

4. The apparatus of claim 1, wherein the first sensor element comprises a light source and photo-detector array, and the second sensor element comprises a light reflector.

5. The apparatus of claim 1, wherein the first sensor element comprises an autocollimator and the second sensor element comprises a light reflector.

6. The apparatus of claim 1, wherein the first interior surface is orthogonal to the second interior surface; and
   wherein the first exterior surface is orthogonal to the second exterior surface.

7. A system, comprising:
   an apparatus comprising:
      a chassis having a first interior surface and a second interior surface;
      an inertial-sensor assembly disposed within the chassis and having a first exterior surface and a second exterior surface;
      a first sensor element mounted on the first interior surface; and
      a second sensor element mounted on the first exterior surface, at least one of the first and second sensor elements configured to generate a first signal corresponding to an angle of displacement of the second sensor element with respect to the first sensor element;
      a third sensor element mounted on the second interior surface; and
      a fourth sensor element mounted on the second exterior surface, at least one of the third and fourth sensor elements configured to generate a second signal corresponding to a second angle of displacement of the fourth sensor element with respect to the third sensor element; and
   a computer-readable medium having stored thereon instructions that, when executed by an electronic device coupled to the at least one of the first and second sensor elements, enable the electronic device to determine an orientation solution for the object based on information provided by the inertial-sensor assembly and the angle of displacement of the first exterior surface with respect to the first interior surface.

8. The system of claim 7, wherein the instructions, when executed by the electronic device coupled to the at least one of the first and second sensor elements, further enable the device to determine an orientation solution for the object based on information provided by the inertial-sensor assembly and the second angle of displacement of the second exterior surface with respect to the second interior surface.

9. A method implementable in an apparatus coupled to an object and operable to provide information pertaining to the orientation of the object, the apparatus including a chassis and an inertial-sensor assembly non-rigidly mounted within the chassis, the method comprising the steps of:
   mounting a first sensor element to a first interior surface of the chassis;
   mounting a second sensor element to a first exterior surface of the inertial-sensor assembly, at least one of the first and second sensor elements configured to generate a first signal corresponding to an angle of displacement of the second sensor element with respect to the first sensor element;
   determining an orientation solution for the object based on information provided by the inertial-sensor assembly and the angle of displacement of the first exterior surface with respect to the first interior surface;
   wherein the first sensor element comprises a light source and photo-detector array; and
   wherein the second sensor element comprises a light reflector.

10. The system of claim 9, wherein the first interior surface is orthogonal to a second interior surface of the chassis; and
   wherein the first exterior surface is orthogonal to a second exterior surface of the inertial-sensor assembly.

11. An apparatus for providing information pertaining to the orientation of an object to which the apparatus is coupled, the apparatus comprising:
   a chassis having a first interior surface;
   an inertial-sensor assembly disposed within the chassis and having a first exterior surface;
   a first sensor element mounted on the first interior surface;
   a second sensor element mounted on the first exterior surface, at least one of the first and second sensor elements configured to generate a first signal corresponding to an angle of displacement of the second sensor element with respect to the first sensor element;
   wherein the first sensor element comprises a light source and photo-detector array; and
   wherein the second sensor element comprises a light reflector.

12. The apparatus of claim 11, further comprising a processing device coupled to the first photo-detector array and configured to determine, based on the generated first signal, an angle of displacement of the first exterior surface with respect to the first interior surface.

13. The apparatus of claim 12, wherein the processing device is further operable to determine an orientation solution for the object based on information provided by the inertial-sensor assembly and the determined angle of displacement of the first exterior surface with respect to the first interior surface.

14. The apparatus of claim 11, wherein the light source is a laser.

15. The apparatus of claim 11, wherein the light reflector is a mirror.

16. An apparatus for providing information pertaining to the orientation of an object to which the apparatus is coupled, the apparatus comprising:
   a chassis having a first interior surface;
   an inertial-sensor assembly disposed within the chassis and having a first exterior surface;
   a first sensor element mounted on the first interior surface;
   a second sensor element mounted on the first exterior surface, at least one of the first and second sensor elements configured to generate a first signal corresponding to an angle of displacement of the second sensor element with respect to the first sensor element; and
   wherein the first sensor element comprises an autocollimator and the second sensor element comprises a light reflector.

17. The apparatus of claim 16, further comprising a processing device coupled to at least one of the first and second sensor elements and configured to determine an orientation solution for the object based on information provided by the inertial-sensor assembly and the determined angle of displacement of the first exterior surface with respect to the first interior surface.

18. A method implementable in an apparatus coupled to an object and operable to provide information pertaining to the orientation of the object, the apparatus including a chassis and an inertial-sensor assembly non-rigidly mounted within the chassis, the method comprising the steps of:
   mounting a first sensor element to a first interior surface of the chassis;
   mounting a second sensor element to a first exterior surface of the inertial-sensor assembly, at least one of the first and second sensor elements configured to generate a first signal corresponding to an angle of displacement of the second sensor element with respect to the first sensor element;
   determining an orientation solution for the object based on information provided by the inertial-sensor assembly and the angle of displacement of the first exterior surface with respect to the first interior surface; and
   wherein the first sensor element comprises an autocollimator and the second sensor element comprises a light reflector.

19. A method implementable in an apparatus coupled to an object and operable to provide information pertaining to the orientation of the object, the apparatus including a chassis and an inertial-sensor assembly non-rigidly mounted within the chassis, the method comprising the steps of:
   mounting a first sensor element to a first interior surface of the chassis;
   mounting a second sensor element to a first exterior surface of the inertial-sensor assembly, at least one of the first and second sensor elements configured to generate a first signal corresponding to a first angle of displacement of the second sensor element with respect to the first sensor element;
   mounting a third sensor element to a second interior surface of the chassis;
   mounting a fourth sensor element to a second exterior surface of the inertial-sensor assembly, at least one of the second and third sensor elements configured to generate a second signal corresponding to a second angle of displacement of the second sensor element with respect to the second sensor element;
   determining an orientation solution for the object based on the first angle of displacement of the first exterior surface with respect to the first interior surface, and the second angle of displacement of the second exterior surface with respect to the second interior surface.

* * * * *